US008651566B2

(12) United States Patent
Nakaaki

(10) Patent No.: US 8,651,566 B2
(45) Date of Patent: Feb. 18, 2014

(54) VEHICLE REINFORCING STRUCTURE

(71) Applicant: Suzuki Motor Corporation, Hamamatsu (JP)

(72) Inventor: Kazuyoshi Nakaaki, Hamamatsu (JP)

(73) Assignee: Suzuki Motor Corporation, Hamamatsu (JP)

( * ) Notice: Subject to any disclaimer, the term of this patent is extended or adjusted under 35 U.S.C. 154(b) by 0 days.

(21) Appl. No.: 13/734,767

(22) Filed: Jan. 4, 2013

(65) Prior Publication Data

US 2013/0193719 A1 Aug. 1, 2013

(30) Foreign Application Priority Data

Jan. 6, 2012 (JP) ................................ 2012-001213

(51) Int. Cl.
*B62D 25/06* (2006.01)
*B62D 25/02* (2006.01)
*B62D 27/00* (2006.01)

(52) U.S. Cl.
USPC ..................................... 296/210; 296/203.03

(58) Field of Classification Search
USPC ............. 296/187.12, 187.13, 193.05, 193.06, 296/193.12, 203.01, 203.03, 210, 29, 30
See application file for complete search history.

(56) References Cited

U.S. PATENT DOCUMENTS

| | | | | |
|---|---|---|---|---|
| 5,318,338 A * | 6/1994 | Ikeda | ............................. | 296/210 |
| 6,578,909 B1 * | 6/2003 | Reed et al. | ..................... | 296/210 |
| 7,213,874 B2 * | 5/2007 | Osterberg et al. | ............. | 296/210 |
| 7,290,831 B2 * | 11/2007 | Poss et al. | ................. | 296/203.03 |
| 7,407,222 B2 * | 8/2008 | Anderson et al. | ........ | 296/193.06 |
| 7,543,884 B2 * | 6/2009 | Reed et al. | ..................... | 296/210 |
| 7,758,109 B2 * | 7/2010 | Reed et al. | ..................... | 296/210 |
| 7,883,142 B2 * | 2/2011 | Hosaka et al. | ................ | 296/210 |
| 8,042,863 B2 * | 10/2011 | Nydam | ......................... | 296/210 |
| 2005/0253422 A1 * | 11/2005 | Tomozawa | ................ | 296/203.03 |
| 2006/0202518 A1 * | 9/2006 | Osterberg et al. | ......... | 296/193.12 |
| 2013/0082484 A1 * | 4/2013 | Wagner et al. | ................ | 296/210 |
| 2013/0193719 A1 * | 8/2013 | Nakaaki | ........................ | 296/210 |

FOREIGN PATENT DOCUMENTS

JP 2010-221825 10/2010

* cited by examiner

*Primary Examiner* — Glenn Dayoan
*Assistant Examiner* — Gregory Blankenship
(74) *Attorney, Agent, or Firm* — Silicon Valley Patent Group LLP

(57) ABSTRACT

A vehicle reinforcing structure includes a roof member, a pillar member that has in its upper part an extension part that extends along the roof member, and a reinforcing member that is joined so as to bridge the extension part and the roof member. The reinforcing member has a first welded part welded to the extension part, and a second welded part welded to a front edge of the roof member. The first welded part and the second welded part are provided such that an imaginary area created with straight lines that connect the respective edges of the welded parts substantially fits within the area of the reinforcing member. The reinforcing member further has an open area on the vehicle interior side of the first welded part on the rear side of the second welded part, the open area being in contact neither with the pillar member nor with the roof member.

7 Claims, 6 Drawing Sheets

PART A ENLARGED

SECTION C-C

SECTION D-D

SECTION E-E

VIEW ON ARROW F

VEHICLE REINFORCING STRUCTURE

CROSS-REFERENCE TO RELATED APPLICATION(S)

This application claims the benefit of and priority to Japanese Patent Application No. 2012-001213, filed on Jan. 6, 2012 and entitled "Vehicle Reinforcing Structure", which is assigned to the assignee hereof and which is incorporated herein by reference.

FIELD

The present invention relates to a vehicle reinforcing structure that reinforces the area around a border between a side wall and a ceiling of a vehicle.

BACKGROUND

In order to secure rigidity, fundamental structures of a vehicle, such as a side body and a roof, are configured with a plurality of panel members placed one on another. It is known that, when a vehicle is subjected to an unexpected impact, a load is likely to be concentrated in the area around the border between the side body and the roof among such fundamental structures. In particular, the side body needs to support the roof and is thus often set to have high rigidity, and it is confirmed through roof crash tests according to, for example, a regulation in North America (FMVSS216a) that the roof is more likely to be deformed than the side body when there are such load concentrations, which may be cause for concern.

For example, in the vehicle upper side part structure described in Japanese Patent Laid-open Publication No. 2010-221825, a reinforcing member called a gusset is attached so as to bridge the roof and a pillar of the side body. In detail, in a cross section in the vehicle width direction, the gusset is diagonally attached such that the corner between the pillar and the roof is filled. In Japanese Patent Laid-open Publication No. 2010-221825, this configuration prevents the pillar from moving toward the vehicle interior side especially in the event of side impact.

Currently, further downsizing of vehicles is required, and it is desired that the side body and other members as well as structures that reinforce them as described above have simple configurations. In this regard, the gusset of Japanese Patent Laid-open Publication No. 2010-221825 bulges toward the vehicle interior side at the corner between the pillar and the roof. Such a configuration results in a reduced cabin space, and there is room for an improvement.

In view of the aforementioned problems, an object of the present invention is to provide a vehicle reinforcing structure that has a simple configuration and that makes it possible to enhance rigidity in the area around the border between the side body and the roof.

SUMMARY OF THE DISCLOSURE

To solve the foregoing problems, a representative configuration of the vehicle reinforcing structure of the present invention is characterized by a vehicle reinforcing structure that reinforces an area around a border between a side body and a roof of a vehicle, including a roof member that is formed from sheet metal and constitutes the roof, a pillar member that is formed from sheet metal, constitutes a pillar of the side body, and has, in an upper part that extends in a vertical direction, an extension part that extends along a side edge of the roof member, and a reinforcing member that is joined so as to bridge the extension part and the roof member, wherein the reinforcing member has a first welded part that is provided so as to extend in a vehicle front-rear direction and welded to the extension part, and a second welded part that is provided on a front side or a rear side of the reinforcing member so as to extend in a vehicle width direction and welded to the roof member, an imaginary area created by lines connecting respective edges of the first welded part and the second welded part fits substantially within an area of the reinforcing member, and the reinforcing member further has an open area on a vehicle interior side of the first welded part on a side opposite the second welded part in the vehicle front-rear direction, the open area being in contact neither with the pillar member nor with the roof member.

Usually, the pillar member is thicker than the roof member and has high rigidity, and therefore the aforementioned extension part is provided on the pillar member so as to be positioned along the roof member, and these members are jointed together there. However, the pillar member is thick and is likely to be heavy, resulting in a vehicle weight increase if a wide extension part is provided. In this regard, the aforementioned configuration includes a reinforcing member, and the pillar member and the roof member are joined together in a highly rigid manner using the reinforcing member without increasing the extension part.

The reinforcing member connects the pillar member and the roof member by the first welded part and the second welded part provided so as to extend in mutually different directions. In particular, an open area is provided on the vehicle interior side on one side in the vehicle front-rear direction of the respective welded parts. Due to this configuration, for example, in the case where the second welded part is provided on the front side of the reinforcing member, when a load is applied from the pillar member in the vehicle interior direction, the load applied from the first welded part does not act straight as-is in the vehicle interior direction to the roof front member, but is first transmitted toward the second welded part that is present diagonally forward in the vehicle. That is, the load is applied to the reinforcing member in a diagonal direction in which high flexural rigidity can be demonstrated.

Moreover, in the aforementioned configuration, the second welded part extends in the vehicle width direction while the load applied to the reinforcing member acts diagonally toward the vehicle front. That is, the load is also applied to the second welded part diagonally. As described above, the first and second welded parts are not arranged in-line in the vehicle width direction and extend in mutually different directions, thus making it possible to prevent a local stress concentration on the first and second welded parts and the reinforcing member itself and prevent breakage.

As described above, the load can be absorbed by the reinforcing member in a highly rigid manner, thus making it possible to prevent the members from breaking when the vehicle is subjected to an impact. In particular, it is possible to suitably prevent deformation of the roof member that often has less rigidity than the pillar member.

The vehicle reinforcing structure may further include a level difference part within the area of the reinforcing member, wherein the reinforcing member and the extension part, or the reinforcing member and the roof member are curved together in both the vehicle width direction and the vehicle front-rear direction in the level difference part. This configuration makes positioning easy when attaching the members and thus makes it possible to reduce labor.

The first welded part may be provided in a place that is within the level difference part and that is where the reinforcing member and the extension part are in surface-contact with each other in the vehicle width direction. This makes it possible to prevent a stress concentration on the first welded part when a load is generated in the vehicle width direction and prevent the first welded part from breaking.

The roof member may include a roof outer panel that is formed from sheet metal and disposed on the vehicle exterior side and a roof sub-member that is formed from sheet metal and disposed on the vehicle interior side of the roof outer panel so as to extend in the vehicle width direction, and the second welded part may be provided in a double contact area in which the roof outer panel and the roof sub-member are in contact. In this way, the second welded part is provided in the double contact area that is particularly a highly rigid portion of the roof member, thus making it possible to suitably absorb the load transmitted via the reinforcing member and prevent breakage.

As described above, a vehicle reinforcing structure that has a simple configuration and that makes it possible to enhance rigidity in the area around the border between the side body and the roof can be provided.

DETAILED DESCRIPTION

Figure 1A:
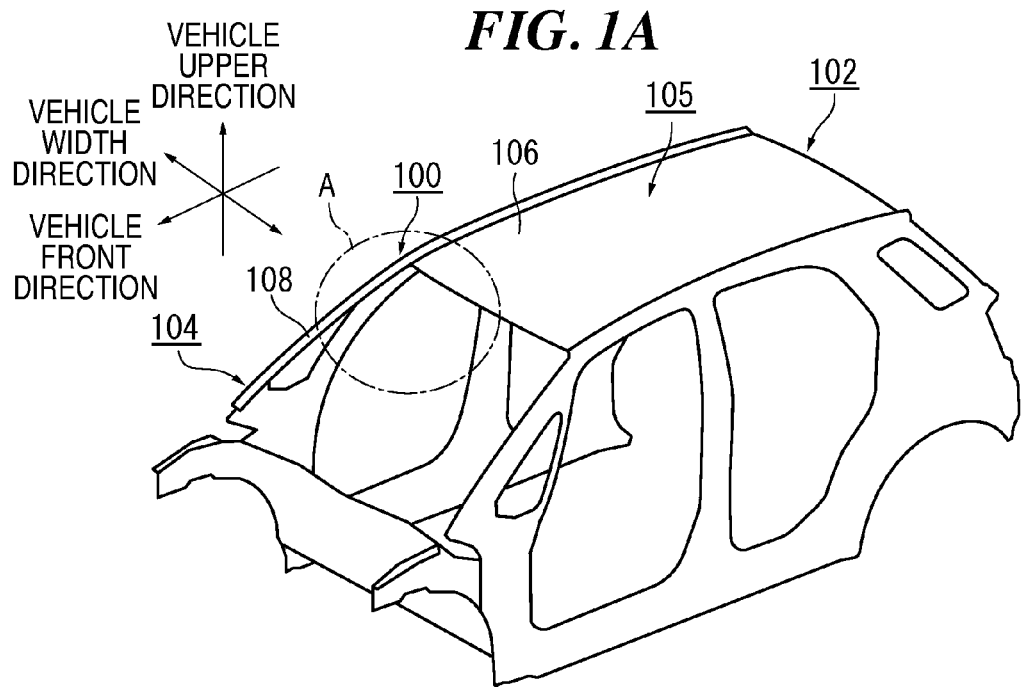
FIGS. 1A and 1B are diagrams showing a vehicle reinforcing structure of one embodiment.

Preferred embodiments of the present invention will now be described in detail below in reference to the accompanying drawings. Dimensions, materials, specific numerical values, etc. provided in the embodiments are merely illustrative to help understand the invention, and are not to limit the present invention unless indicated otherwise. In the specification and the drawings, elements that have essentially the same function or configuration are given the same numerical references to avoid repetitions in the description, and elements that are not directly related to the present invention are not shown in the drawings.

Figure 1B:
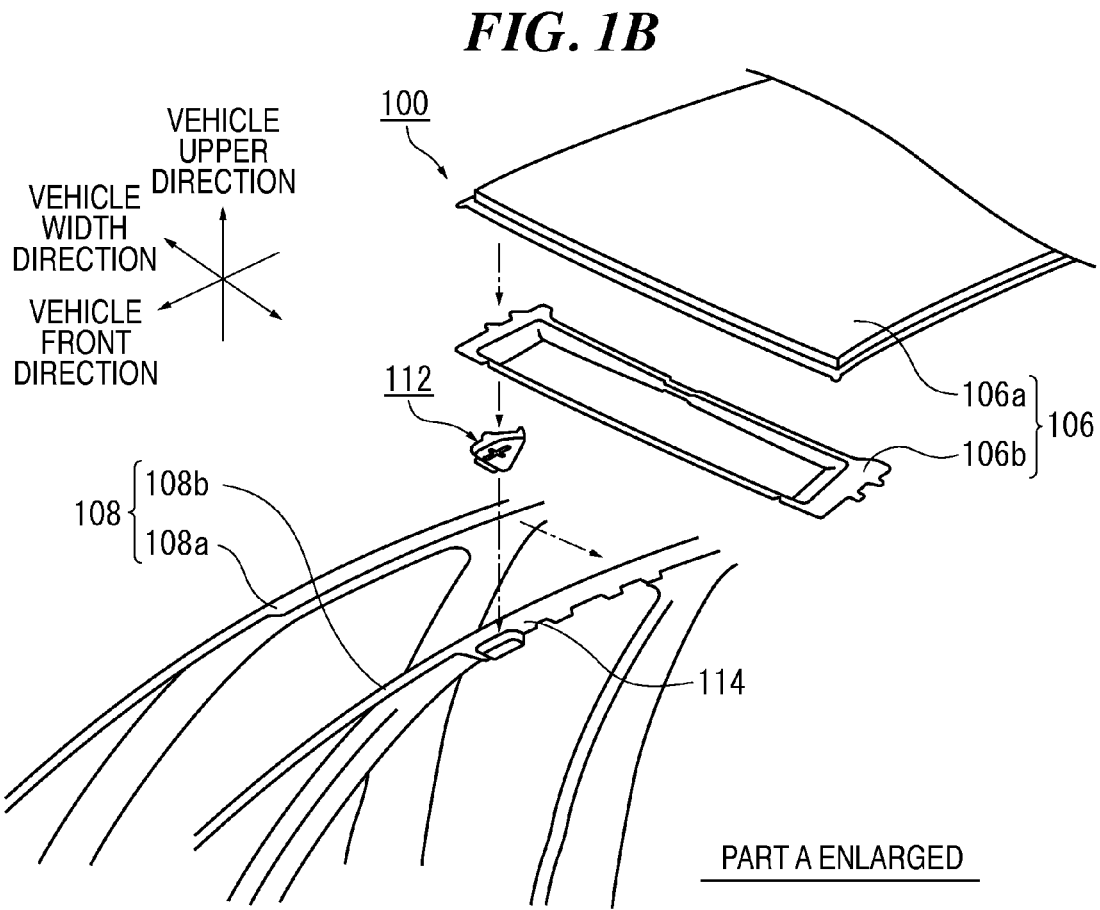

FIGS. 1A and 1B are diagrams showing a vehicle reinforcing structure 100 of this embodiment. FIG. 1A schematically shows fundamental structures of a vehicle 102 to which the vehicle reinforcing structure 100 is applied.

In the vehicle 102 shown in FIG. 1A, the vehicle reinforcing structure 100 of this embodiment reinforces the area around the border between a side body 104 and a roof 105 on the front side of the vehicle. In particular, in this embodiment, the vehicle reinforcing structure 100 enhances the rigidity of the front side of the area around the border between a front pillar member 108 of the side body 104 and a roof member 106 constituting the roof 105 (the area around a part A).

FIG. 1B is an enlarged diagram of the part A of FIG. 1A. Each of the members shown in FIG. 1B is a panel member formed from sheet metal. First, the front pillar member 108 is configured to include two panel members, i.e., a side body outer panel 108a on the vehicle exterior side and a pillar inner panel 108b on the vehicle interior side. Also, the roof member 106 is configured to include two panel members, i.e., a roof outer panel 106a on the vehicle exterior side and a roof front member 106b disposed so as to extend in the vehicle width direction on the front side and the vehicle interior side of the roof outer panel 106a.

Generally, the front pillar member 108 needs to support the roof member 106, and is thus thicker than the roof member 106 and rigid. Therefore, conventionally, the front pillar member is provided with a broad extension part along the roof member, and the front pillar member and the roof member are joined together at the extension part. However, in this embodiment, the front pillar member and the roof member are joined together using a reinforcing member 112, and accordingly, an extension part 114, which will be described below, has a reduced area and thus a simple configuration.

The reinforcing member 112 is a member that is joined so as to bridge the front pillar member 108 and the roof member 106 and reinforces these members. In this embodiment, the reinforcing member 112 is disposed between a pillar inner panel 108b that is disposed below and a roof front member 106b that is disposed above. In particular, the reinforcing member 112 is disposed on the extension part 114 of the pillar inner panel 108b. The extension part 114 is, of the pillar inner panel 108b extending in the vehicle vertical direction, a portion extending in the vehicle width direction along the side edge of the roof front member 106b in the upper part of the pillar inner panel 108b.

Figure 2A:
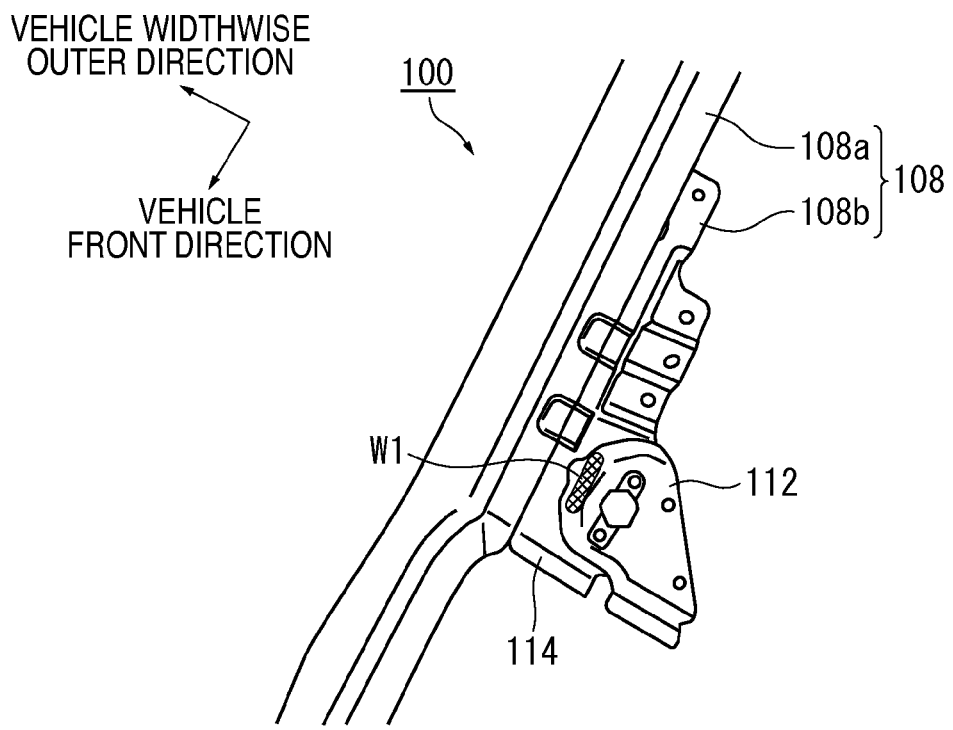
FIGS. 2A and 2B are diagrams showing the vehicle reinforcing structure of FIG. 1B as viewed from above.
Figure 2B:
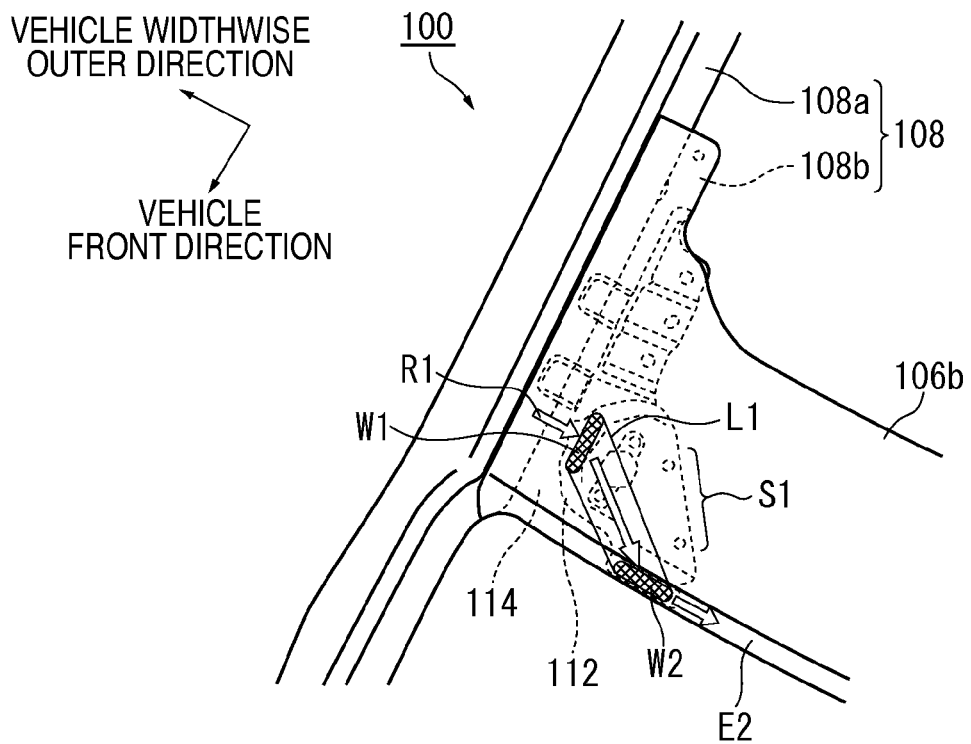

FIGS. 2A and 2B are diagrams showing the vehicle reinforcing structure 100 of FIG. 1B as viewed from above. FIG. 2A shows only the front pillar member 108 and the reinforcing member 112. As shown in FIG. 2A, the reinforcing member 112 is provided with a first welded part W1 that is welded to the extension part 114. The first welded part W1 is provided so as to extend in the vehicle front-rear direction on the vehicle exterior side in the vehicle width direction.

FIG. 2B is a diagram showing the vehicle reinforcing structure 100 of FIG. 2A to which the roof front member 106b has been added. As shown in FIG. 2B, the reinforcing member 112 is provided with a second welded part W2 that is welded to the front edge of the roof front member 106b. The second welded part W2 is provided so as to extend in the vehicle width direction on the front side in the vehicle front-rear direction.

As described above, the first welded part W1 and the second welded part W2 are provided so as to extend in mutually different directions. Here, the first welded part W1 and the second welded part W2 are provided such that an imaginary area (imaginary area L1) created with straight lines that connect the respective edges of the welded parts substantially fits within the area of the reinforcing member 112. This is a configuration to prevent a local stress concentration on the reinforcing member 112 when a load is applied to the reinforcing member 112 from one of the welded parts and spreads to the other welded part. This makes it possible to prevent the reinforcing member 112 from breaking and suitably absorb the load.

Figure 3A:
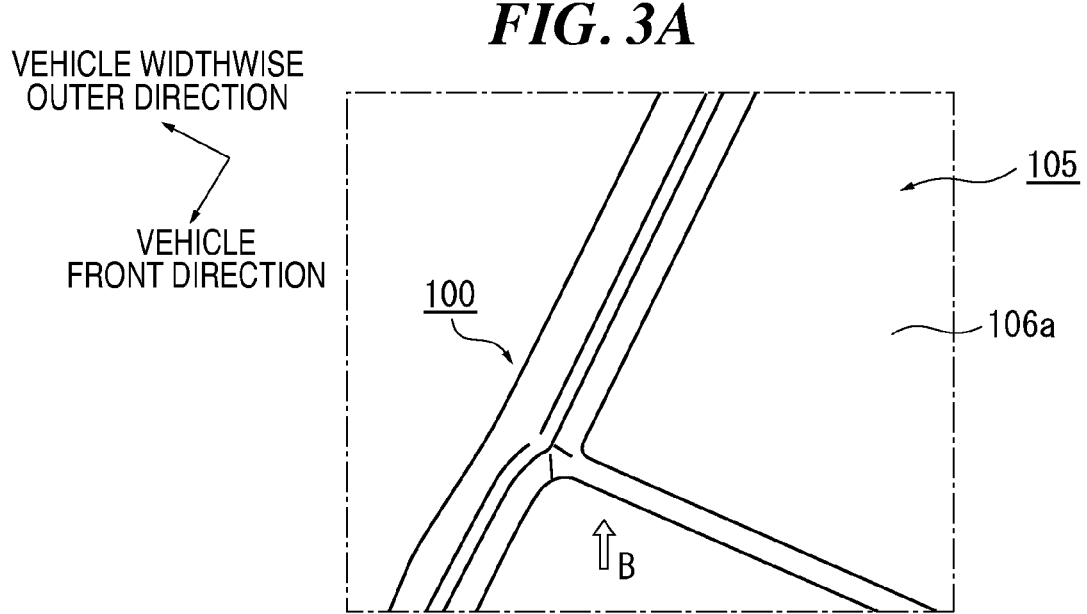
FIGS. 3A and 3B are diagrams showing the vehicle reinforcing structure as viewed from different directions.
Figure 3B:
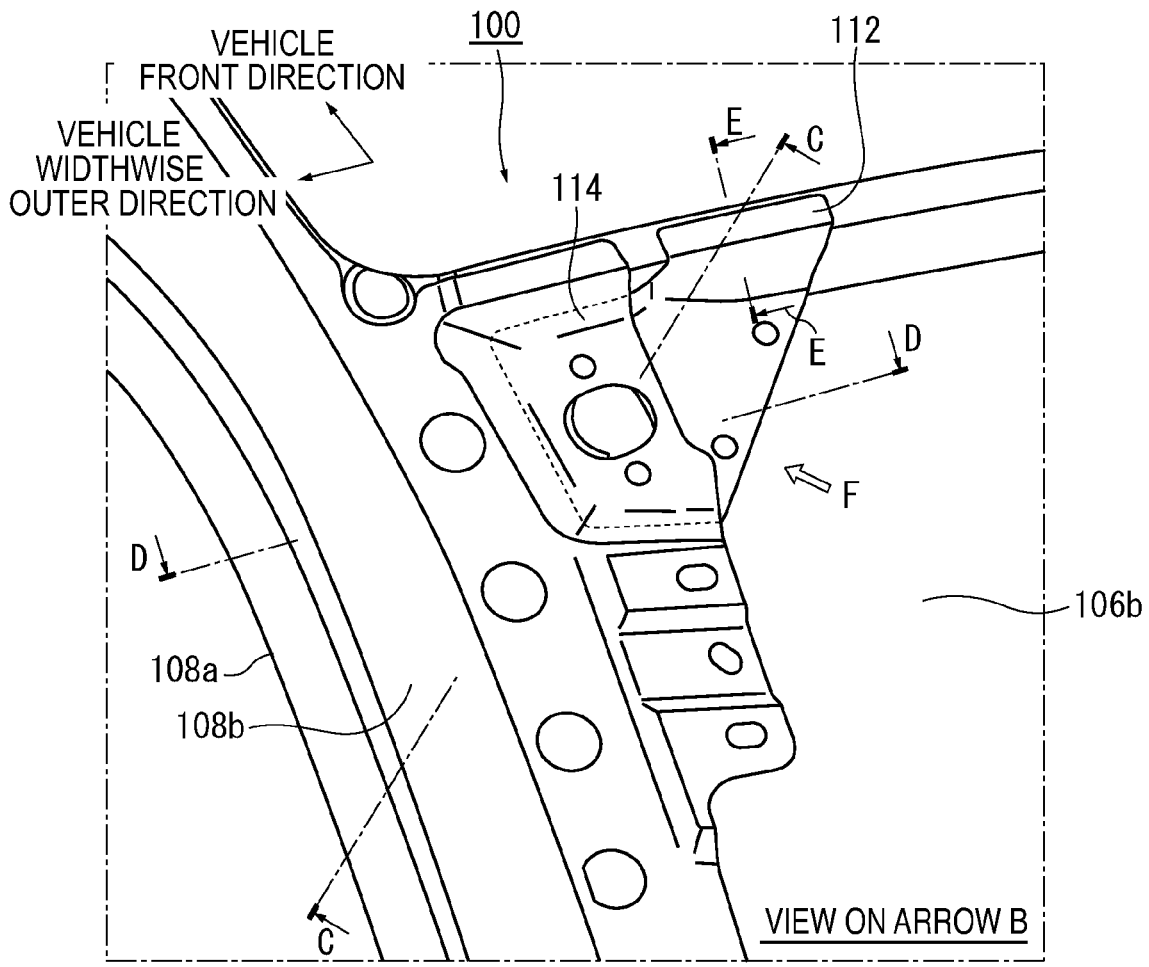

FIGS. 3A and 3B are diagrams showing the vehicle reinforcing structure 100 as viewed from different directions. FIG. 3A is a diagram showing the vehicle reinforcing structure of FIG. 2B to which the roof outer panel 106a has been added. As shown in FIG. 3A, the roof outer panel 106a serves as the exterior of the roof 105. With the roof outer panel 106a attached, neither the reinforcing member 112 (see FIG. 2B) nor the roof front member 106b is visible.

FIG. 3B is an arrow B diagram as viewed in the direction of the arrow B in FIG. 3A. As shown in FIG. 3B, the reinforcing member 112 is disposed in a position sandwiched between the extension part 114 below and the roof front member 106b above, and is welded thereto. Below, descriptions are further provided based on FIG. 3B.

Figure 4A:
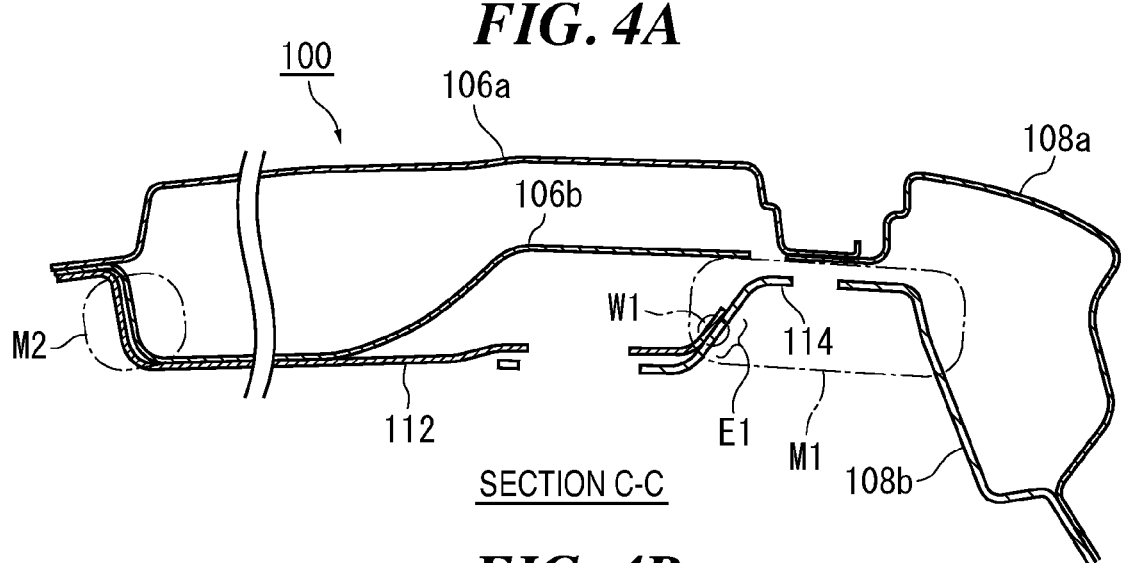
FIGS. 4A, 4B, and 4C show cross-sectional diagrams of FIG. 3B.
Figure 4B:
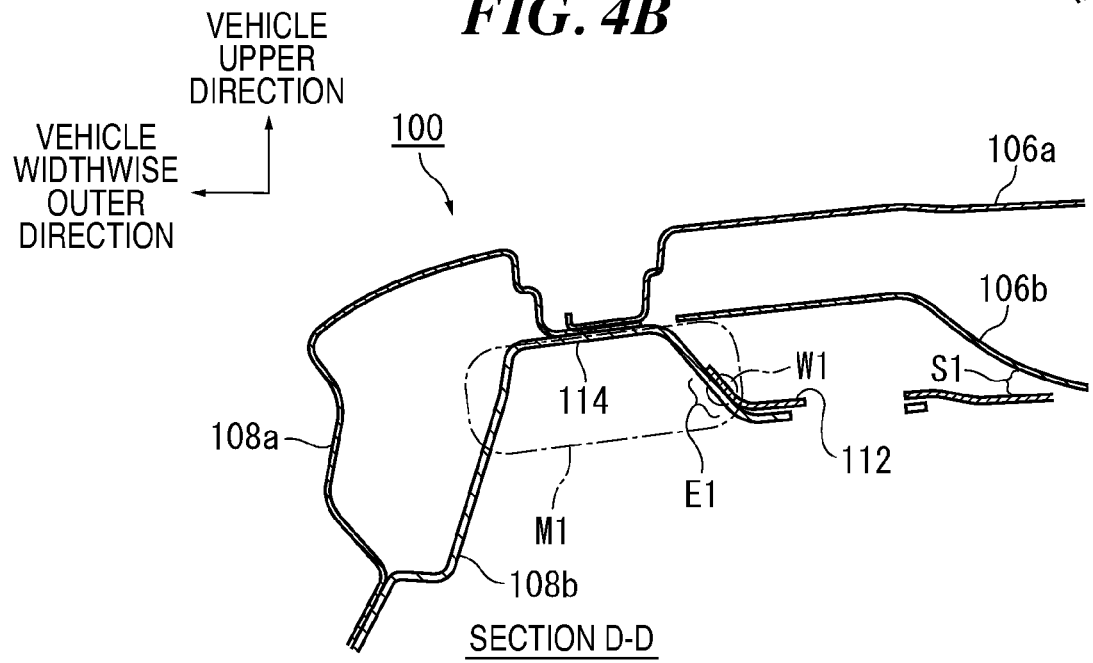
Figure 4C:
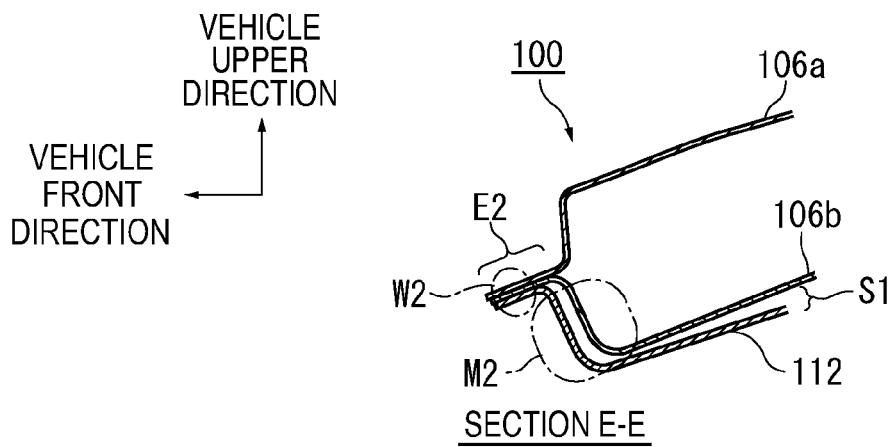

FIGS. 4A, 4B, and 4C show cross-sectional diagrams taken along the lines in FIG. 3B. FIG. 4A is a cross-sectional diagram taken along the line C-C of FIG. 3B. The C-C cross-sectional diagram shows a cross section that is diagonal to the vehicle width direction and the vehicle front-rear direction of FIG. 3B. As shown in FIG. 4A, a first level difference part M1 in which the reinforcing member 112 and the extension part 114 are curved together and a second level difference part M2 in which the reinforcing member 112 and the roof front member 106b are curved together are provided. These level difference parts are provided such that either one is present within the area of the reinforcing member 112 in the vehicle width direction (see the first level difference part M1 of FIG. 4B) or in the vehicle front-rear direction (see the second stage difference part M2 of FIG. 4C). This configuration makes it easy to position the reinforcing member 112 when attaching the reinforcing member 112 to other members and thus makes it possible to reduce labor. Note that a plurality of level difference parts may be provided, or they may form one continuous level difference part as a whole.

FIG. 4B is a cross-sectional diagram taken along the line D-D in FIG. 3B. As shown in FIG. 4B, the first welded part W1 is provided in a vehicle width direction contact area E1 that is within the first level difference part M1 and that is where the reinforcing member 112 and the extension part 114 both extend substantially in the vertical direction and are in surface-contact with each other in the vehicle width direction. Accordingly, a load applied from the pillar inner panel 108b to the reinforcing member 112 and a load applied from the reinforcing member 112 to the pillar inner panel 108b are in the vehicle width direction while the shear direction of the first welded part W1 is in the vertical direction, and thus an application of a load to the shear direction is avoided. This configuration prevents the first welded part W1 from breaking.

FIG. 4C is a cross-sectional diagram taken along the line E-E in FIG. 3B. As shown in FIG. 4C, the second welded part W2 is provided in a double contact area E2 that is where the front edges of the roof outer panel 106a and the roof front member 106b are located and where they contact each other. In this way, the reinforcing member 112 is jointed to the double contact area E2 that is a particularly rigid portion of the roof member 106, thus making it possible to suitably absorb the load transmitted via the reinforcing member 112 and prevent breakage.

Figure 5:
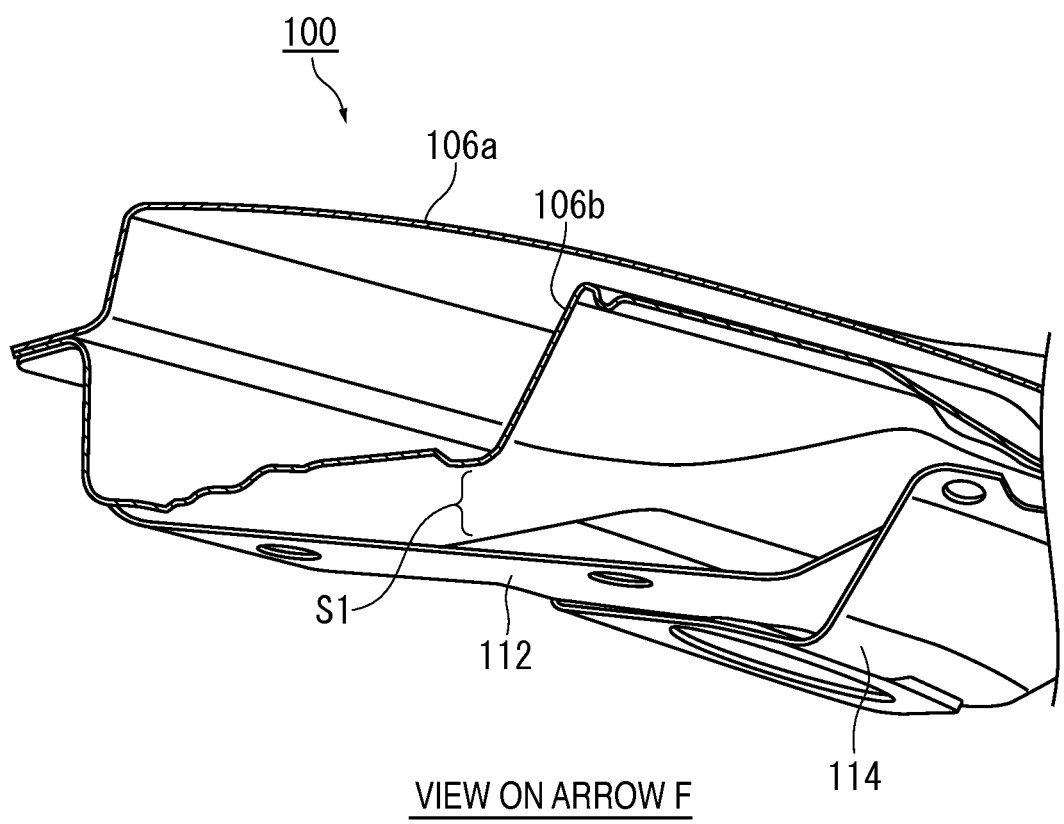
FIG. 5 is an arrow F diagram as viewed in the direction of arrow F in FIG. 3B.

Further structural features of the reinforcing member 112 will now be described. FIG. 5 is an arrow F diagram as viewed in the direction of the arrow F in FIG. 3B. FIG. 5 is a perspective diagram of the reinforcing member 112 as viewed from the vehicle interior side from the vehicle rear side. As shown in FIG. 5, from the vehicle interior side to the vehicle rear side of the reinforcing member 112, the reinforcing member 112 is not joined to either the roof front member 106b or the pillar inner panel 108b, and an open area S1 is provided.

Refer back to FIGS. 4A, 4B, and 4C. As shown in FIG. 4B, the open area S1 is provided on the vehicle interior side that is opposite the first welded part W1 of the reinforcing member 112 in the vehicle width direction. This configuration is to disperse the load when a load is applied to the reinforcing member 112 via the pillar inner panel 108b, thus not allowing it to act straight in the vehicle interior direction.

Also, as shown in FIG. 4C, the open area S1 is provided on the vehicle rear side that is a side opposite the second welded part W2 of the reinforcing member 112 in the vehicle front-rear direction. This configuration also is to disperse the load when a load is applied to the reinforcing member 112 via the roof front member 106b or the like, thus not allowing it to act straight in the vehicle rear direction.

In the vehicle reinforcing structure 100, the occurrence of damage is further suppressed by the open area S1. Refer back to FIG. 2B. For example, when a load (arrow R1) is applied from the pillar member toward the inner side in the vehicle width direction, the load (arrow R1) applied from the first welded part W1 does not act straight as-is in the vehicle interior direction to the roof front member 106b, but is first transmitted toward the second welded part W2 that is present diagonally forward in the vehicle. That is, the load is applied to the reinforcing member 112 in a diagonal direction (arrow R1) in which high flexural rigidity can be demonstrated.

Moreover, the second welded part W2 extends in the vehicle width direction relative to the load acting diagonally toward the vehicle front (arrow R1). Thereby, the load (arrow R1) is diagonally applied also to the second welded part W2. In particular, the second welded part W2 is provided in the double contact area E2, which has high rigidity. As described above, the first and second welded parts (W1 and W2) are not arranged in-line in the vehicle width direction and extend in mutually different directions, thus making it possible to prevent a local stress concentration on the first and second welded parts (W1 and W2) and the reinforcing member 112 itself and absorb the load in a highly rigid manner. Accordingly, it is possible to prevent the members from breaking when the vehicle 102 (see FIG. 1A) is subject to an impact. In particular, it is possible to prevent deformation of the roof front member 106b, which often has less rigidity than the pillar inner panel 108b.

As described above, the vehicle reinforcing structure 100 of this embodiment makes it possible to enhance rigidity in the area around the border between the side body 104 (see FIG. 1A) and the roof 105 using a simple configuration. Accordingly, for example, the range of the extension part 114 of the pillar inner panel 108b (see FIG. 1B) is smaller than that of conventional parts, and this can contribute to reducing the weight of the vehicle 102 and enhancing the yield in the production of the pillar inner panel 108b. Also, the reinforcing member 112 is disposed along the pillar inner panel 108b and the roof front member 106b and is space-efficient, and is therefore unlikely to reduce the cabin space.

Modifications of Reinforcing Member

The reinforcing member 112 (see, for example, FIG. 1B) described above is applied to the vehicle front side of the roof 105 and reinforces this area. However, the reinforcing member 112 is not limited thereto, and can be applied also to the vehicle center side and the vehicle rear side of the roof 105. Also, neither the position of the second welded part W2 nor the position of the open area S1 is limited to the places described in connection with the reinforcing member 112 above.

Figure 6:
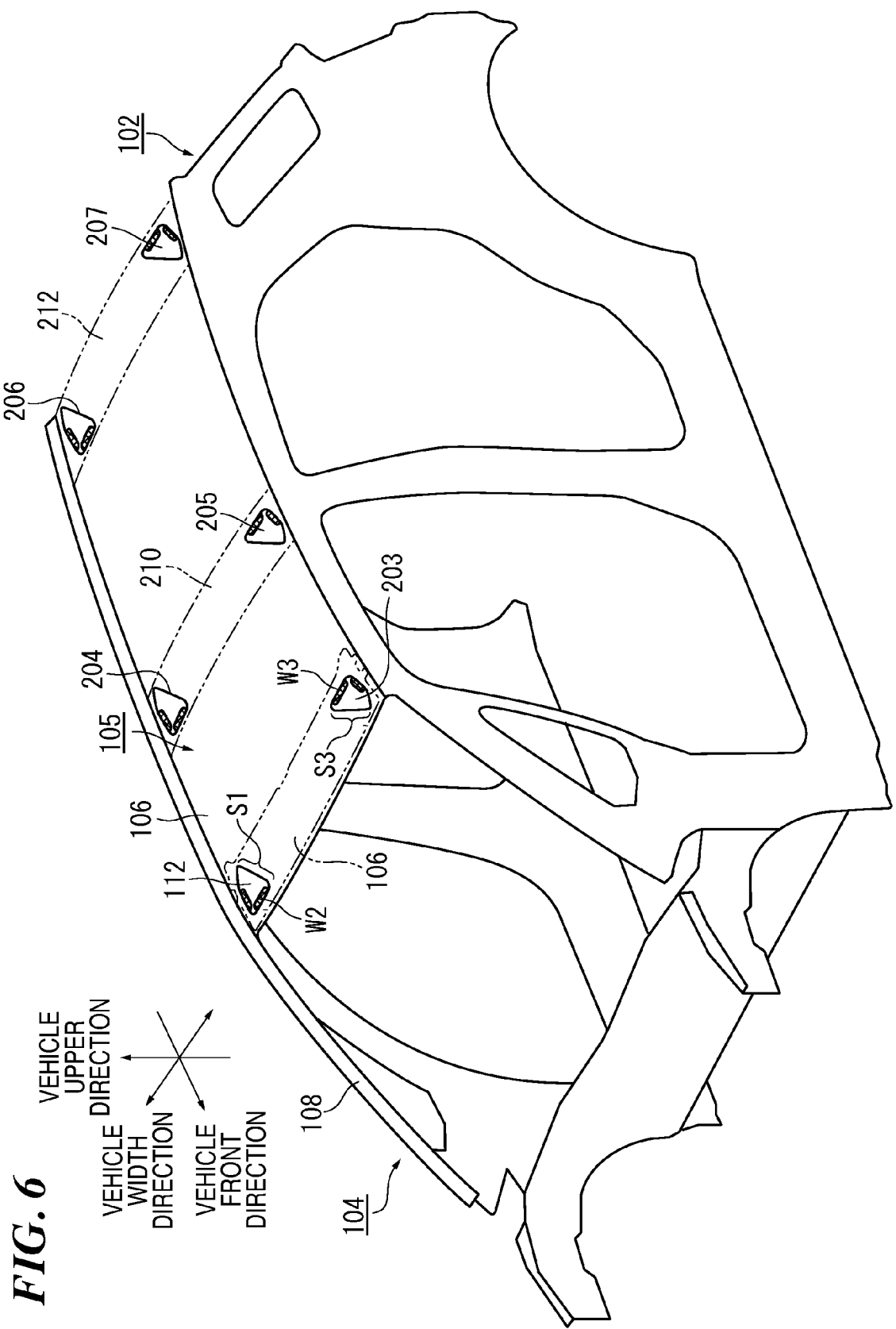
FIG. 6 is a diagram showing modifications of a reinforcing member.

FIG. 6 is a diagram showing modifications of the reinforcing member 112. First, a reinforcing member 203, as with the reinforcing member 112, is attached to an area of the roof front member 106b, but a second welded part W3 is provided on the rear side of the reinforcing member 203, and the second welded part W3 is in parallel with the rear edge of the roof front member 106b. In addition, an open area S3 is provided on the vehicle interior side on the front side of the reinforcing member 203, and the reinforcing member 203 is different from the reinforcing member 112 in these points.

Also, for example, reinforcing members (reinforcing members 204 and 205) are applicable also to the areas around the borders between a roof sub-member 210 that is attached to the vehicle center side of the roof outer panel 106a and respective pillar members. In the reinforcing members 204 and 205 also, second welded parts and open areas can be set in suitable places either on the vehicle front side or the vehicle rear side. Also, reinforcing members 206 and 207 are similarly applicable to the areas around the borders between a roof sub-member 212 on the vehicle rear side and respective pillar members. Reinforcing members having these configurations also make it possible to enhance rigidity in the area around the border between the side body and the roof using a simple configuration.

So far, preferable embodiments of the present invention have been described in reference to the accompanying drawings, but naturally the present invention is not limited to such embodiments. It is clear that a person skilled in the art will suitably perform various changes and modifications within the scope of the claims, and naturally it is understood that they are also encompassed with in the technical scope of the present invention.

The present invention can be used as a vehicle reinforcing structure that reinforces the area around a border between a side wall and a ceiling of a vehicle.

The invention claimed is:

1. A vehicle reinforcing structure that reinforces an area around a border between a side body and a roof of a vehicle, comprising:
   a roof member that is formed from sheet metal and constitutes the roof;
   a pillar member that is formed from sheet metal, constitutes a pillar of the side body, and has, in an upper part that extends in a vertical direction, an extension part that extends along a side edge of the roof member; and
   a reinforcing member that is joined so as to bridge the extension part and the roof member, wherein
   the reinforcing member has:
      a first welded part that is provided so as to extend in a vehicle front-rear direction and welded to the extension part; and
      a second welded part that is provided on a front side or a rear side of the reinforcing member so as to extend in a vehicle width direction and welded to the roof member;
   an imaginary area created by lines connecting respective edges of the first welded part and the second welded part fits substantially within an area of the reinforcing member; and
   the reinforcing member further has an open area on a vehicle interior side of the first welded part on a side opposite the second welded part in the vehicle front-rear direction, the open area being in contact neither with the pillar member nor with the roof member.

2. The vehicle reinforcing structure according to claim 1, further comprising a level difference part within the area of the reinforcing member, wherein:
   in the level difference part, the reinforcing member and the extension part, or the reinforcing member and the roof member are curved together in both the vehicle width direction and the vehicle front-rear direction.

3. The vehicle reinforcing structure according to claim 1, wherein:
   the first welded part is provided in a place that is within a level difference part and that is where the reinforcing member and the extension part are in surface-contact with each other in the vehicle width direction.

4. The vehicle reinforcing structure according to claim 2, wherein:
   the first welded part is provided in a place that is within the level difference part and that is where the reinforcing member and the extension part are in surface-contact with each other in the vehicle width direction.

5. The vehicle reinforcing structure according to claim 1, wherein:
   the roof member includes a roof outer panel that is formed from sheet metal and disposed on the vehicle exterior side and a roof sub-member that is formed from sheet metal and disposed on the vehicle interior side of the roof outer panel so as to extend in the vehicle width direction; and
   the second welded part is provided in a double contact area in which the roof outer panel and the roof sub-member are in contact.

6. The vehicle reinforcing structure according to claim 2, wherein:
   the roof member includes a roof outer panel that is formed from sheet metal and disposed on the vehicle exterior side and a roof sub-member that is formed from sheet metal and disposed on the vehicle interior side of the roof outer panel so as to extend in the vehicle width direction; and
   the second welded part is provided in a double contact area in which the roof outer panel and the roof sub-member are in contact.

7. The vehicle reinforcing structure according to claim 3, wherein:
   the roof member includes a roof outer panel that is formed from sheet metal and disposed on the vehicle exterior side and a roof sub-member that is formed from sheet metal and disposed on the vehicle interior side of the roof outer panel so as to extend in the vehicle width direction; and
   the second welded part is provided in a double contact area in which the roof outer panel and the roof sub-member are in contact.

* * * * *